US012345393B1

(12) United States Patent
Zheng

(10) Patent No.: US 12,345,393 B1
(45) Date of Patent: Jul. 1, 2025

(54) LAMP SET MODULE WITH T-SHAPED CONNECTING ROD

(71) Applicant: JOININ GLOBAL PTE. LTD., Singapore (SG)

(72) Inventor: Hongbing Zheng, Singapore (SG)

(73) Assignee: JOININ GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/905,736

(22) Filed: Oct. 3, 2024

(30) Foreign Application Priority Data

Sep. 12, 2024 (CN) ......................... 202422236220.6

(51) Int. Cl.

*F21V 17/10* (2006.01)
*F21S 4/28* (2016.01)
*F21S 8/04* (2006.01)
*F21V 17/16* (2006.01)
*F21V 23/00* (2015.01)
*F21V 33/00* (2006.01)
*F21Y 103/33* (2016.01)

(52) U.S. Cl.

CPC .............. *F21V 17/104* (2013.01); *F21S 4/28* (2016.01); *F21S 8/043* (2013.01); *F21S 8/046* (2013.01); *F21V 17/164* (2013.01); *F21V 23/002* (2013.01); *F21V 33/0096* (2013.01); *F21Y 2103/33* (2016.08)

(58) Field of Classification Search

CPC ... F21S 4/28; F21S 8/043; F21S 8/046; F21Y 2103/33; F21V 17/104; F21V 17/164
See application file for complete search history.

(56) References Cited

U.S. PATENT DOCUMENTS

2008/0192487 A1* 8/2008 Giegerich ................. F21S 2/00 362/352
2008/0213094 A1* 9/2008 Okimura ............... F04D 25/088 416/5
2014/0199168 A1* 7/2014 Spiro .................. F21V 21/0832 416/5

(Continued)

FOREIGN PATENT DOCUMENTS

WO WO-2014010789 A1 * 1/2014 ................ F21S 8/04

*Primary Examiner* — Alexander K Garlen
(74) *Attorney, Agent, or Firm* — Schwegman Lundberg & Woessner, P.A.

(57) ABSTRACT

A lamp set module with a T-shaped connecting rod which includes a mounting base and at least two luminous modules. Each of the at least two luminous modules includes a luminous frame, a frame module and a connecting rod, one end of the connecting rod is connected to a middle of the frame module, and the other end of the connecting rod is connected to the mounting base. The luminous frame includes a luminous member and a light-transmitting shield. The luminous member is arranged within the light-transmitting shield, and a lower surface of the frame module is covered and fixed on the light-transmitting shield. The frame module and the light-transmitting shield are respectively provided with a buckling member, and buckling members can be buckled and connected with each other. Each luminous module is independent and can be transported independently, which reduces transportation cost, provides a stable structure after being combined.

7 Claims, 4 Drawing Sheets

(56) References Cited

U.S. PATENT DOCUMENTS

| | | | | |
|---|---|---|---|---|
| 2015/0285451 | A1* | 10/2015 | Luo | F21V 1/00<br>362/96 |
| 2019/0242563 | A1* | 8/2019 | Xu | F21V 23/007 |
| 2022/0128066 | A1* | 4/2022 | Huang | F21V 33/0096 |
| 2022/0349539 | A1* | 11/2022 | Graff | F21S 8/046 |
| 2023/0097560 | A1* | 3/2023 | Chang | F21V 33/0096<br>416/204 R |

* cited by examiner

LAMP SET MODULE WITH T-SHAPED CONNECTING ROD

CROSS REFERENCE TO THE RELATED APPLICATIONS

This Non-provisional application claims priority under 35 U.S.C. § 119 (a) to Chinese Patent Application No. CN202422236220.6 filed on Sep. 12, 2024, the entire content of which is hereby incorporated by reference.

TECHNICAL FIELD

The disclosure relates to a lighting fixture and a fan lamp, in particular to a lamp set module with a T-shaped connecting rod.

BACKGROUND ART

A fan lamp is an electrical appliance that combines functions of a chandelier and a ceiling fan. Besides basic functions such as lighting and ventilation, most of fan lamps have a decorative function, and there are two types of fan lamps, namely, a traditional straight-blade fan lamp and a blade-hidden fan lamp, in the market.

Illuminants of existing fan lamps generally adopt an integrated molded housing, which is easy to deform, and have a wide and thick light-emitting surface, and an integrated all-plastic fan lamp presents a large volume, high packaging cost and high transportation cost.

An existing modular fan lamp generally includes: a volute, a fan assembly, a diffusion device, an air inlet, an air outlet, an air outlet channel and a lighting assembly. The fan assembly includes a motor and an operation wheel. The diffusion device includes a bearing wall for installing the fan assembly and a first diffusion mechanism positioned at one side of the bearing wall and circumferentially arranged around the operation wheel. The air outlet channel is enclosed by the volute and the diffusion device. A light diffusion plate of the lighting assembly is fully covered over the other side of the bearing wall. The air outlet is arranged at a periphery of the lighting assembly, and an orthographic projection of the lighting assembly on a light-emitting surface does not exceed a maximum boundary of an orthographic projection of the air outlet. In this fan lamp, the light diffusion plate is fully covered over the other side of the bearing wall, the air outlet is arranged at the periphery of the lighting assembly, and the orthographic projection of the lighting assembly on the light-emitting surface does not exceed the maximum boundary of an orthographic projection of the air outlet, so that a ratio of a luminous area of the fan lamp is improved and a luminous flux is improved. With this technology, it can be seen that modularization in related art still stays at a level of simplified installation, but a structure of an actual product is still large, which is not convenient for transportation. Moreover, it can seen from the specific technical scheme that its lamp and fan interact with each other. Due to existence of the lamp, a ventilation hole of the fan can only operate in an annular air outlet manner in a circumferential direction of the lamp and its air inlet hole is small, which shows that a fan function of this technology is largely weakened.

SUMMARY

Technical problem: an object of the disclosure is to solve problems that light-emitting parts of existing lamps and fan lamps are not modularized so that they cannot be disassembled and transported and are inconvenient to install, and functions of fans and lamps affect each other.

Technical scheme: the disclosure adopts following technical schemes.

A lamp set module with a T-shaped connecting rod includes a mounting base and at least two luminous modules. Each of the at least two luminous modules includes a luminous frame, a frame module and a connecting rod, one end of the connecting rod is connected to a middle of the frame module, the other end of the connecting rod is connected to the mounting base, and each frame module is connected with a respective luminous frame.

As can be seen from schemes of the disclosure, the lamp of the disclosure is of annular segmented design. On one hand, each segment can exist independently due to this segmented design, which facilitates transportation, and segments can be combined so that the combined annular luminous member is not only beautiful but also leaves room for installation of a fan, which further makes functions of the fan and the lamp not affect each other, and both radiating surfaces of the fan and the lamp can be larger and its service life becomes longer.

Further, the luminous frame includes a luminous member and a light-transmitting shield. The luminous member is arranged within the light-transmitting shield, and each frame module is fixed to a respective light-transmitting shield with its low part, so that each frame module is connected with a respective luminous frame.

Further, a lower part of the frame module and an upper part of the light-transmitting shield are respectively provided with a buckling member, and buckling members can be buckled and connected with each other.

The luminous frame and the frame module are both arc-shaped, all of luminous frames are on a concentric circle, and all of frame modules are on a concentric circle.

Arc-shaped frame modules can be matched to form an annular frame module entity, and strip-shaped frame modules can be matched to form a rectangular frame module entity.

Further, one end of each frame module in its circumferential extension direction is provided with a slide rail extending in a vertical direction, and the other end of the frame module is provided with a sliding groove extending in the vertical direction, and all of luminous modules are spliced with each other through the slide rail and the sliding groove of adjacent frame modules.

For the annular luminous module formed by matching the two matched T-shaped connecting rods, matching of the connecting rod and a connecting groove realizes stability against circumferential translation, and design of a matched clamping groove and second buckle of the slide rail and the sliding groove also realizes stability against translation in a height direction, which improves stability of an overall structural. It should be noted that design of the second buckle is adopted because the second buckle has at least one horizontal face, so that circumferential translation can be further prevented in a direction of the horizontal face under influence of static friction after clamping is completed.

Further, the light-transmitting shield of the luminous stand has a width of 12 to 18 mm and a thickness of 22 to 28 mm. The light-transmitting shield is arc-shaped, the width is a dimension of the light-transmitting shield along a horizontal radial direction and the thickness is a dimension of the light-transmitting shield along a vertical direction.

The light-transmitting shield has a narrow edge and a small thickness, which increases light intensity.

The light-transmitting shield adopts a polycarbonate light-transmitting shield, and the mounting base adopts a polycarbonate mounting base.

Further, all of the frame modules are provided with a wire hole, and the connecting rod is provided with a wire slot, and wires are arranged along the wire slot and pass through the wire hole to be electrically connected with the luminous member.

Further, the mounting base is circular in shape, a plurality of connecting grooves for inserting an end of the connecting rod from top to bottom are provided at an upper end of a circumferential side wall of the mounting base, and at least one first buckle which extends upwards and can be inserted into and clamped with a self-contained jack of the end of the connecting rod is provided in the connecting groove.

With this design, translation of the frame module in the circumferential direction is prevented, and translation of the frame module in the height direction is limited within a deformation range of the connecting rod. In this way and in combination with subsequent design of the slide rail and of the second buckle, the overall structure can be stabilized not only in the circumferential direction, but also in the height direction, which improves overall stability of the structure.

Further, a fan module is further mounted below the mounting base.

Beneficial effects: Compared with the related art, the disclosure has following advantages.

1. The overall lamp structure of the disclosure is composed of two or more modules spliced together, which is easier to disassemble and transport, and because the modules are split, a function and structure of each module are independent, so that a single module is not easy to deform.
2. The lamp is modularized, simple to assemble, and is with a bottom provided with heat dissipating holes, thus with better heat dissipation and guaranteed service life.
3. The fan lamp can be assembled and disassembled in a modular manner, which simplifies and reduces packaging and facilitates transportation.
4. The module frame has a narrow and thin light-emitting surface, which increases light intensity and has a simple and beautiful appearance.

DETAILED DESCRIPTION

The disclosure will be further explained in the following according to drawings and embodiments.

Embodiment 1

Figure 1:
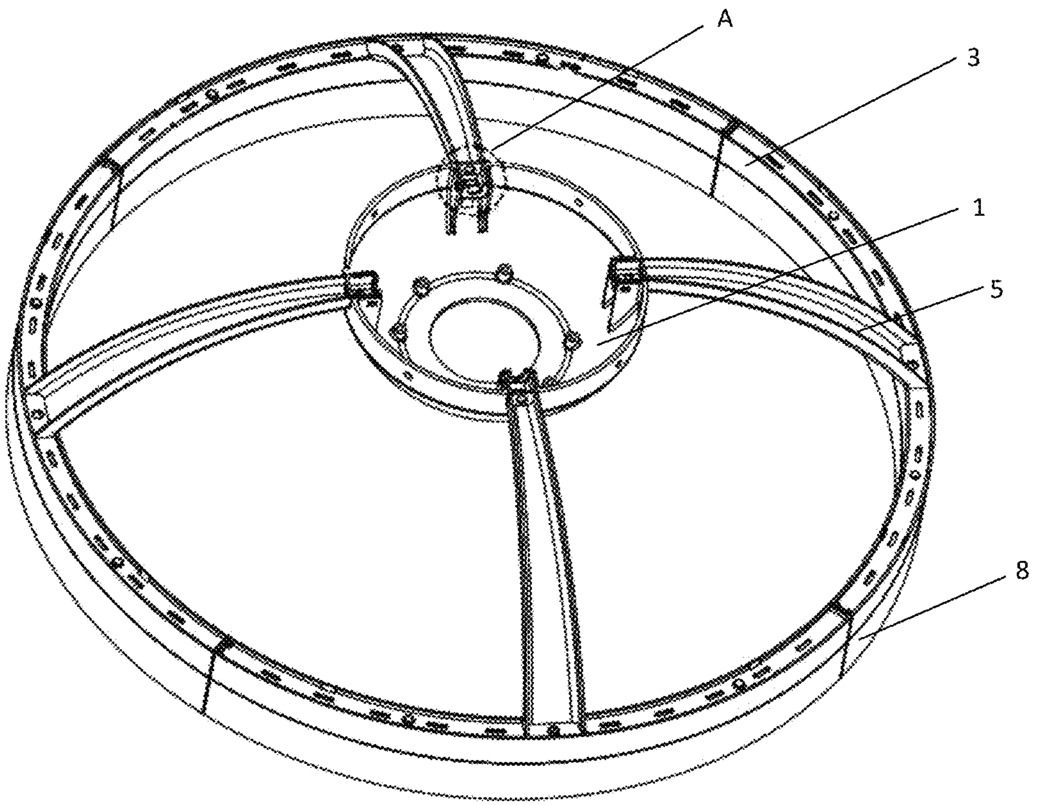
FIG. 1 is a schematic structural view of the disclosure.
Figure 2:
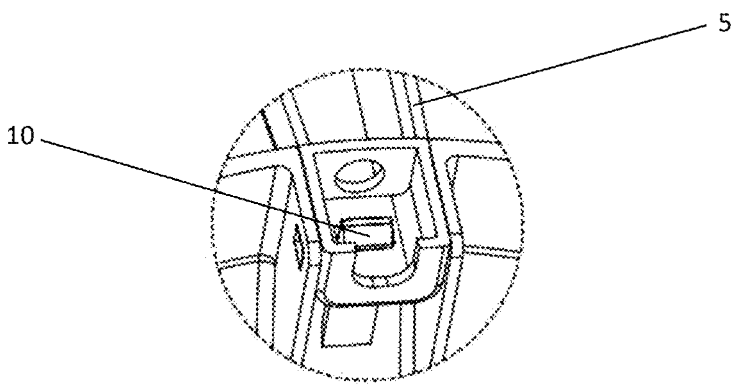
FIG. 2 is a partially enlarged schematic view of the disclosure corresponding to an area A in FIG. 1.
Figure 3:
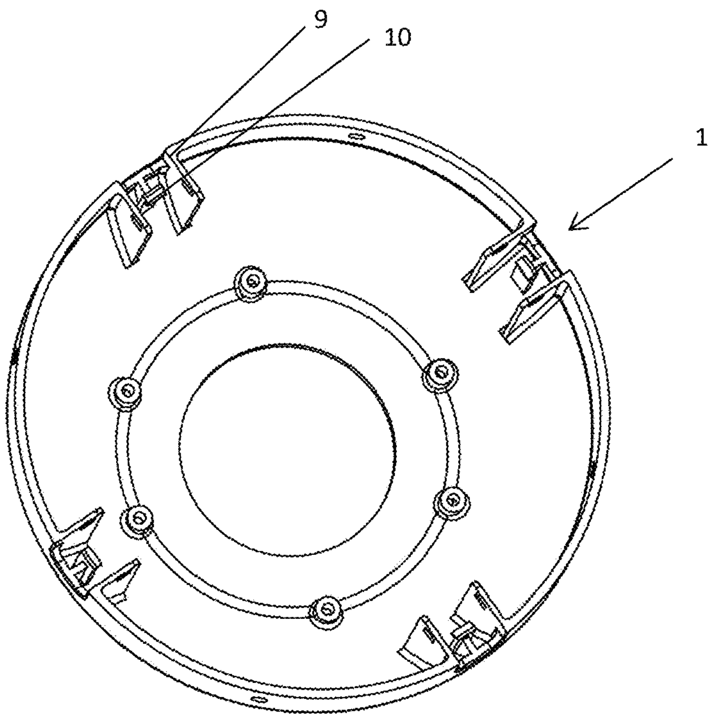
FIG. 3 is a schematic structural view of a mounting base of the disclosure.
Figure 4:
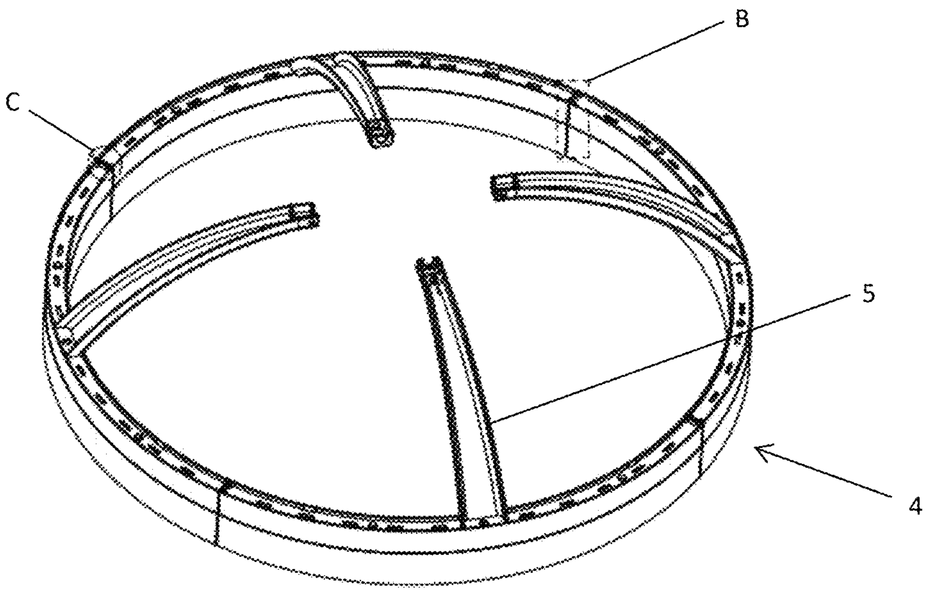
FIG. 4 is a structural schematic diagram of the disclosure without a mounting base mounted.
Figure 5:
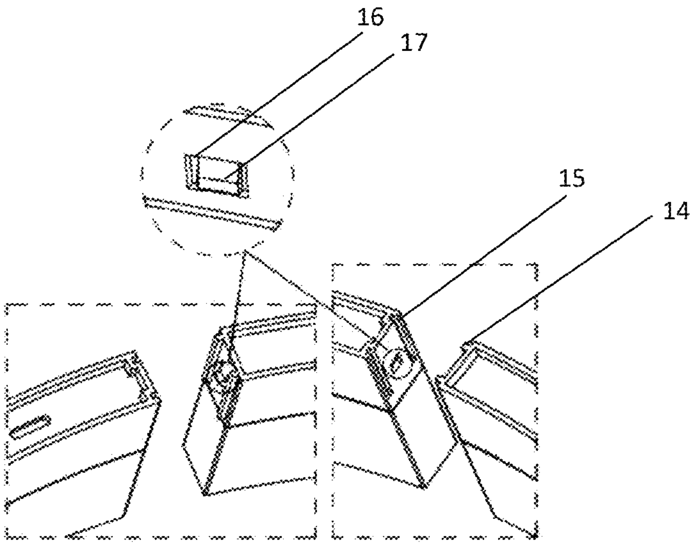
FIG. 5 is a partially enlarged schematic view of the disclosure corresponding to an area B in FIG. 4.
Figure 6:
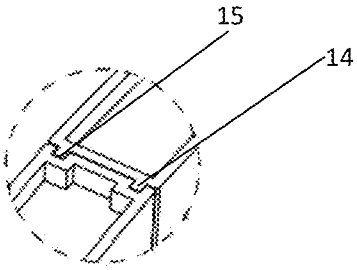
FIG. 6 is a partially enlarged schematic view of the disclosure corresponding to an area C in FIG. 4.
Figure 7:
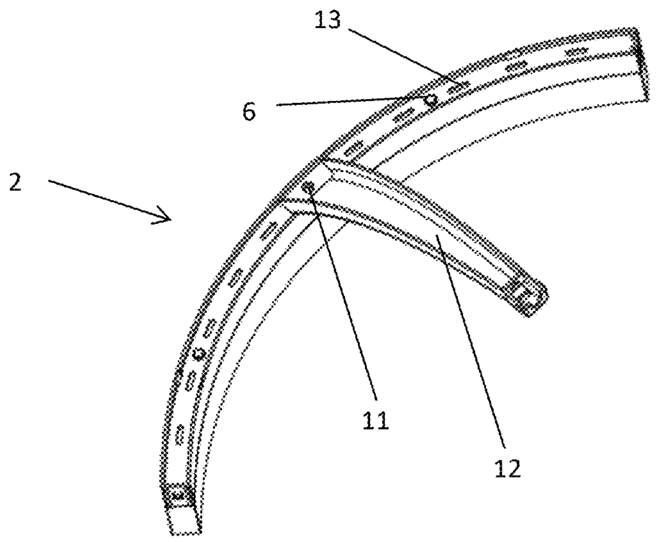
FIG. 7 is a schematic structural view of a luminous module of the disclosure.
Figure 8:
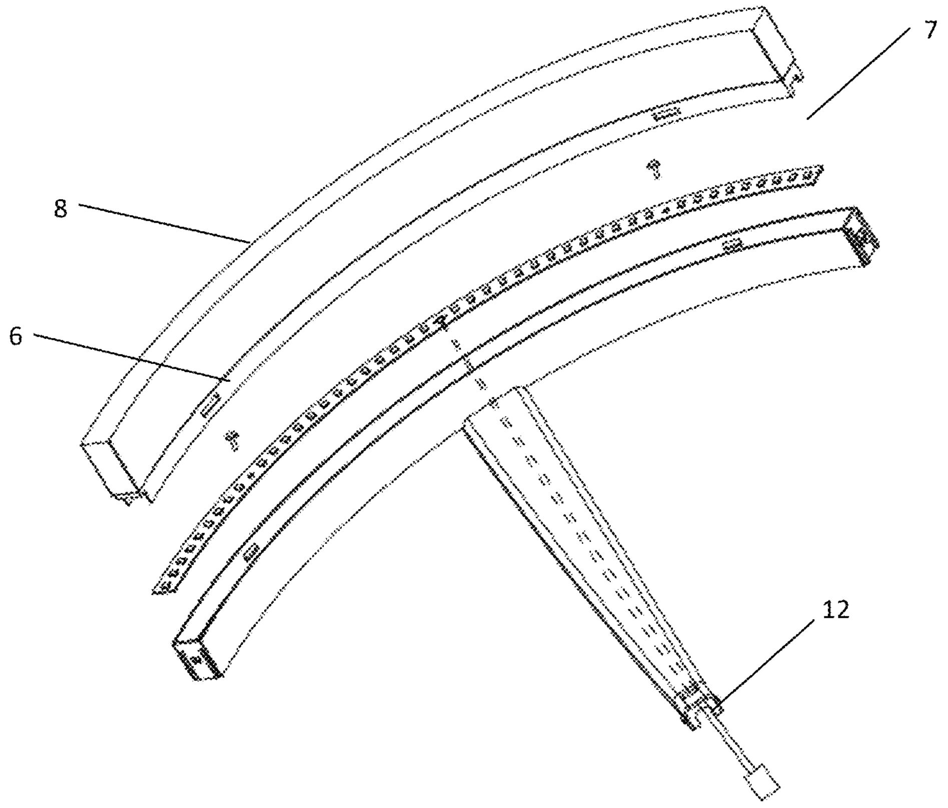
FIG. 8 is a schematic exploded view of a luminous module of the disclosure.

As shown in FIG. 1 to FIG. 8, a lamp set module with a T-shaped connecting rod includes a mounting base 1 and four luminous modules 2, each of the four luminous modules 2 includes an arc-shaped frame 3, a central angle corresponding to the arc-shaped frame is 90°, and four frames are combined to be 360° to form a circle, all of the frames 3 are matched and connected to form an annular frame module entity 4, and the mounting base 1 is arranged above a center of the frame module entity 4. The frame 3 is connected with the mounting base 1 through a connecting rod 5, and the connecting rod 5 is connected and clamped with the mounting base 1. A lower surface of each frame 3 is hollow to form a lower cavity. An LED light bar 7 with a shape adapted to a shape of the lower cavity of the frame 3 is mounted within the lower cavity of the frame 3 through a fixing bolt 6. A light-transmitting shield 8 which can be clamped on an inner wall of the lower cavity of the frame 3 and with a shape adapted to a shape of the frame 3 can be provided below the LED light bar 7, and a wiring terminal of the LED light bar 7 passes through a wire hole 11 of the frame 3 and a wire slot 12 on the connecting rod 5 to be connected to a power supply placed on the mounting base 1.

A lower part of the frame 3 and an upper part of the light-transmitting shield 8 are respectively provided with a buckling member, and buckling members can be buckled and connected with each other.

The mounting base 1 is circular in shape, a plurality of connecting grooves 9 for inserting an end of the connecting rod 5 from top to bottom are provided at an upper end of a circumferential side wall of the mounting base, and at least one first buckle 10 which extends upwards and can be inserted into and clamped with a self-contained jack of the end of the connecting rod 5 is provided in the connecting groove 9.

A bottom surface of the lower cavity of the frame module 3 is provided with a second screw hole (not shown) through which a fixing bolt 6 passes and heat dissipating holes 13 evenly distributed along an extending direction of the bottom surface of the lower cavity.

The light-transmitting shield 8 adopts a polycarbonate light-transmitting shield, and the mounting base 1 adopts a polycarbonate mounting base.

The light-transmitting shield 8 has a width of 12 to 18 mm, such as 14.5 mm, 15 mm, 15.5 mm etc., and a thickness of 22 to 28 mm, such as 24 mm, 25 mm, 26 mm. The light-transmitting shield is arc-shaped. The width is a dimension of the light-transmitting shield along a horizontal radial direction and the thickness is a dimension of the light-transmitting shield along a vertical direction.

One end of each frame 3 in its circumferential extension direction is provided with a slide rail 14 extending in a vertical direction, and the other end of the frame is provided with a sliding groove 15 extending in the vertical direction, and all of luminous modules 2 are spliced with each other through the slide rail 14 and the sliding groove 15 of adjacent frames 3.

One of end faces of the frame 3 is further provided with a second buckle 17 for matching and connecting with the clamping groove 16 provided on an end face of an adjacent frame 3.

Embodiment 2

On a basis of Embodiment 1, a number of the luminous modules 2 is modified to be two, so that the central angle corresponding to the frame module in each luminous module becomes 180°, and the two modules together form a 360° ring structure scheme. A specific number of the luminous modules can be specifically modified according to requirements of production, cost, transportation, etc. With no consideration of transportation cost, the fewer the luminous modules, the better it is, because continuity of lighting can be better (a thickness of a joint of adjacent light-transmitting shields may be doubled, which may affect light transmission, and the lighting may also be discontinuous because of discontinuity between the luminous modules), and corresponding lighting intensity can also be improved. A radius of the combined ring structure can also be increased to increase ventilation of the fan and lighting effect. In order to control cost, the number of the luminous modules are increased, which can facilitate transportation and reduce transportation cost.

What is claimed is:

1. A lamp set module with a T-shaped connecting rod, comprising a mounting base and at least two luminous modules, wherein each of the at least two luminous modules comprises a luminous frame, a frame module and a connecting rod, one end of the connecting rod being connected to a middle of the frame module, the other end of the connecting rod being connected to the mounting base, and each frame module being connected with a respective luminous frame, wherein the luminous frame comprises a luminous member and a light-transmitting shield, the luminous member being arranged within the light-transmitting shield, and each frame module being fixed to a respective light-transmitting shield with a low part of the frame module, so that each frame module is connected with a respective luminous frame, and wherein one end of each frame module in a circumferential extension direction of the frame module is provided with a slide rail extending in a vertical direction, and the other end of the frame module is provided with a sliding groove extending in the vertical direction, and all of luminous modules are spliced with each other through the slide rail and the sliding groove of adjacent frame modules.

2. The lamp set module with the T-shaped connecting rod according to claim 1, wherein a lower part of the frame module and an upper part of the light-transmitting shield are respectively provided with a buckling member, and buckling members are buckled and connected with each other.

3. The lamp set module with the T-shaped connecting rod according to claim 1, wherein the luminous frame and the frame module are both arc-shaped, all of luminous frames are on a concentric circle, and all of frame modules are on a concentric circle.

4. The lamp set module with the T-shaped connecting rod according to claim 3, wherein the light-transmitting shield of the luminous stand has a width of 12 to 18 mm and a thickness of 22 to 28 mm, wherein the light-transmitting shield is arc-shaped, the width is a dimension of the light-transmitting shield along a horizontal radial direction and the thickness is a dimension of the light-transmitting shield along a vertical direction.

5. The lamp set module with the T-shaped connecting rod according to claim 1, wherein all of the frame modules are provided with a wire hole, and the connecting rod is provided with a wire slot, and wires are arranged along the wire slot and pass through the wire hole to be electrically connected with the luminous member.

6. The lamp set module with the T-shaped connecting rod according to claim 1, wherein the mounting base is circular in shape, a plurality of connecting grooves for inserting an end of the connecting rod from top to bottom are provided at an upper end of a circumferential side wall of the mounting base, and at least one first buckle which extends upwards and is inserted into and clamped with a self-contained jack of the end of the connecting rod is provided in the connecting groove.

7. The lamp set module with the T-shaped connecting rod according to claim 1, wherein a fan module is further mounted below the mounting base.

* * * * *